United States Patent
Yang et al.

(10) Patent No.: US 8,018,712 B2
(45) Date of Patent: Sep. 13, 2011

(54) BUS-BAR FOR JOINTING CAPACITOR

(75) Inventors: Chang Hoon Yang, Cheonan (KR); Dae Jin Park, Cheonan (KR); Yong Won Jun, Chungcheongnam-Do (KR)

(73) Assignee: Nuintek Co., Ltd., Asan (KR)

( * ) Notice: Subject to any disclaimer, the term of this patent is extended or adjusted under 35 U.S.C. 154(b) by 580 days.

(21) Appl. No.: 12/239,427

(22) Filed: Sep. 26, 2008

(65) Prior Publication Data

US 2009/0229849 A1   Sep. 17, 2009

(30) Foreign Application Priority Data

Mar. 13, 2008   (KR) .................. 10-2008-0023107
Apr. 7, 2008   (KR) .................. 10-2008-0032099

(51) Int. Cl.
*H01G 4/38*   (2006.01)
(52) U.S. Cl. ........ 361/328; 361/502; 361/504; 361/512; 361/508; 361/330
(58) Field of Classification Search .............. 361/328, 361/502, 503–504, 509, 512, 303–305, 301.3, 361/329, 330
See application file for complete search history.

(56) References Cited

U.S. PATENT DOCUMENTS

| | | | | |
|---|---|---|---|---|
| 5,384,683 A | * | 1/1995 | Tsunoda | 361/313 |
| 5,867,895 A | * | 2/1999 | Van Beneden et al. | 29/827 |
| 6,473,291 B1 | * | 10/2002 | Stevenson | 361/306.3 |
| 6,545,861 B1 | * | 4/2003 | Hayes et al. | 361/642 |
| 6,707,369 B2 | * | 3/2004 | Morimoto et al. | 337/189 |
| 6,922,326 B2 | * | 7/2005 | Kubota et al. | 361/274.1 |
| 7,477,505 B2 | * | 1/2009 | Timmerman et al. | 361/502 |

* cited by examiner

*Primary Examiner* — Nguyen T Ha
(74) *Attorney, Agent, or Firm* — Schmeiser, Olsen & Watts LLP (57) ABSTRACT

A bus-bar for assembling a capacitor device is disclosed, which is capable of improving the environment of a soldering operation for the bus-bar being soldered to a capacitor device, reducing the inferior rate of the capacitor device while improving the quality of the capacitor device, and reducing the weight of the capacitor module, in soldering the bus-bar to capacitor devices. The lead frame attached to polar plates by soldering is formed thinner than the other parts of the bus-bar, and opening parts having an oval or polygonal shape are formed on a surface of the bus-bar so that two adjoining capacitor devices can be exposed. The lead frame is formed in the opening in order for soldering with the polar plates of the capacitor device.

7 Claims, 8 Drawing Sheets

BUS-BAR FOR JOINTING CAPACITOR

CROSS-REFERENCE TO RELATED APPLICATIONS

This application claims priority to Korean Patent Application Number 10-2008-0023107 filed Mar. 13, 2008 and Korean Patent Application Number 10-2008-0032099 filed Apr. 7, 2008, the disclosures of which are incorporated herein by reference.

BACKGROUND OF THE INVENTION

1. Field of the Invention

The present invention relates to assembling of a vapor-deposited metal film capacitor module used in a winding-type or laminated-type film capacitor device, and more particularly to a bus-bar for assembling a capacitor device, capable of improving the environment of a soldering operation for the bus-bar being soldered to a capacitor device, reducing the inferior rate of the capacitor device while improving the quality of the capacitor device, and reducing the weight of the capacitor module, when forming respective cathode and anode terminals by uniting the same polarities of a plurality of capacitor devices through the bus-bar to modularize the plurality of capacitor devices.

2. Description of the Related Art

In general, electric equipment capacitor devices, phase-advanced capacitor devices and electronic equipment capacitor devices are used in a variety of industrial fields. In the capacitor device, a plastic film such as Polyethylene terephthalate resin, polypropylene resin, polyethylene naphthalate resin, polycarbonate resin and the like is used as a dielectric. The capacitor device is fabricated by winding a vapor-deposited metal film on either or both sides of the plastic film and forming electrodes using Zn or a Zn alloy at both sides of the wound vapor-deposited film. One or more capacitor devices are connected by spot-welding or soldering an electrode lead wire, a bus-bar, or a terminal. The connected capacitor devices are housed in an outer case and then insulated by charging a space between the respective capacitor devices and the outer case with an insulating material such as epoxy. Thus, the capacitor devices are modularized.

Figure 1A:
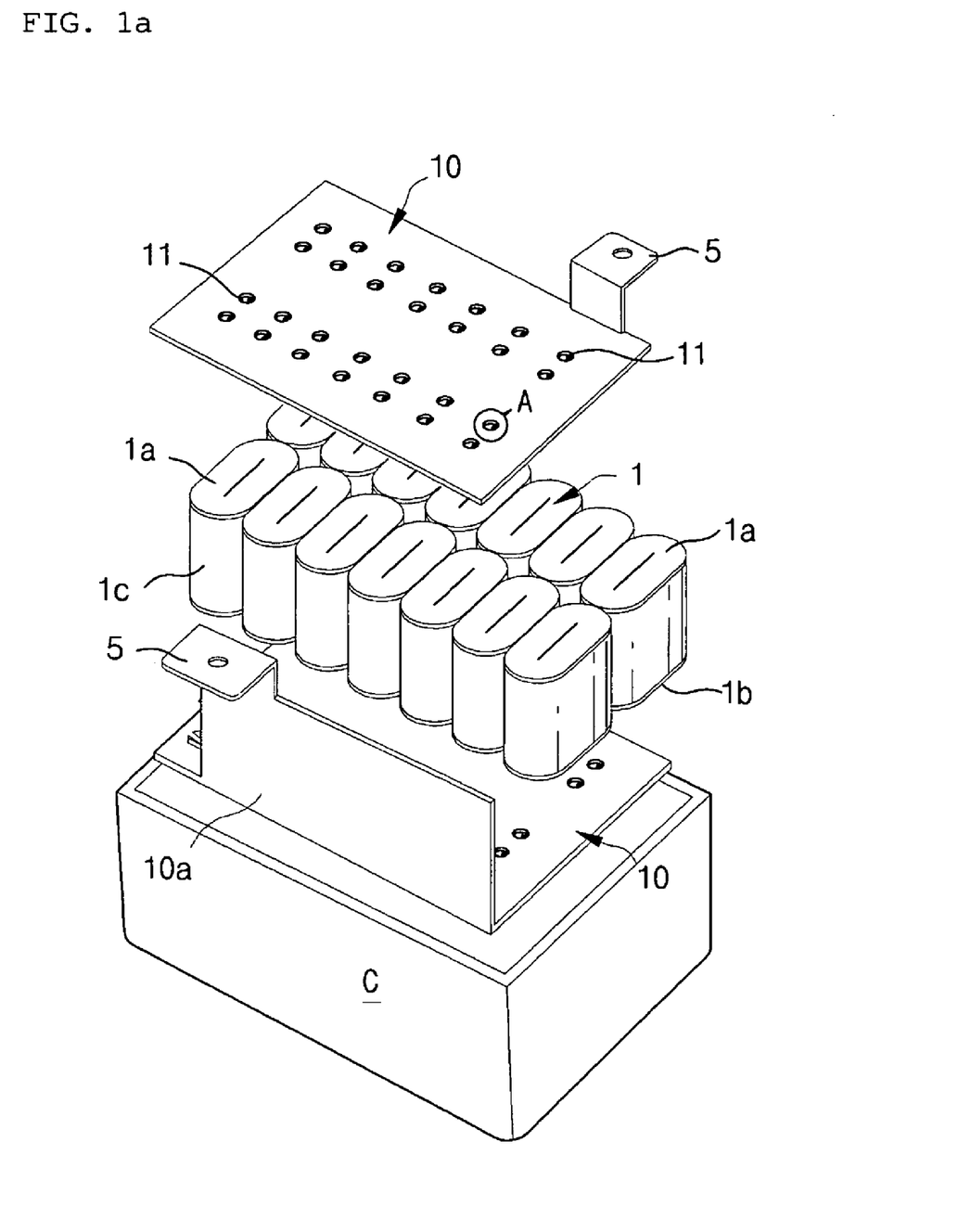
FIG. 1A is an exploded perspective view of a capacitor module according to the conventional art.
Figure 1B:
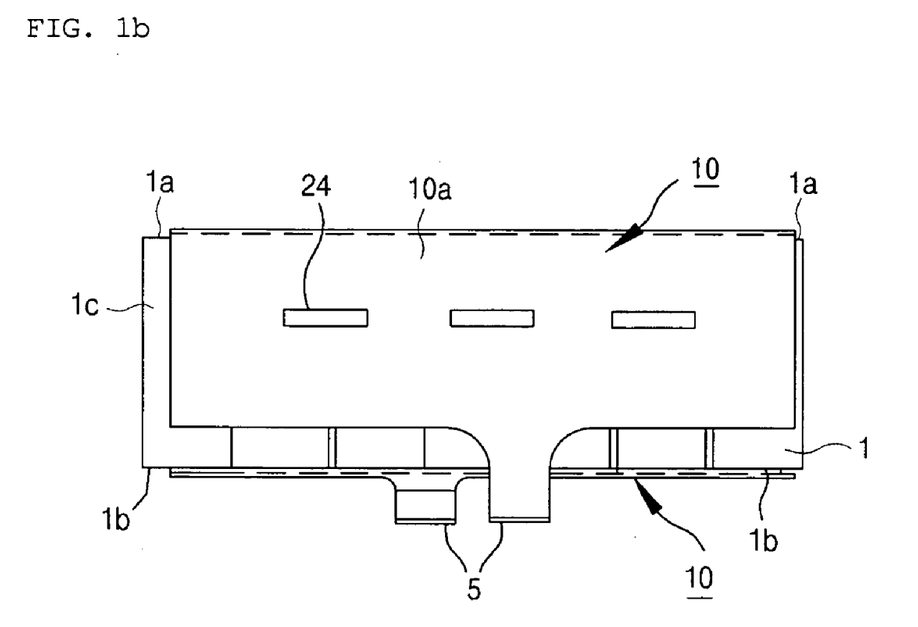
FIG. 1B is an exploded perspective view of another conventional capacitor module.
Figure 2:
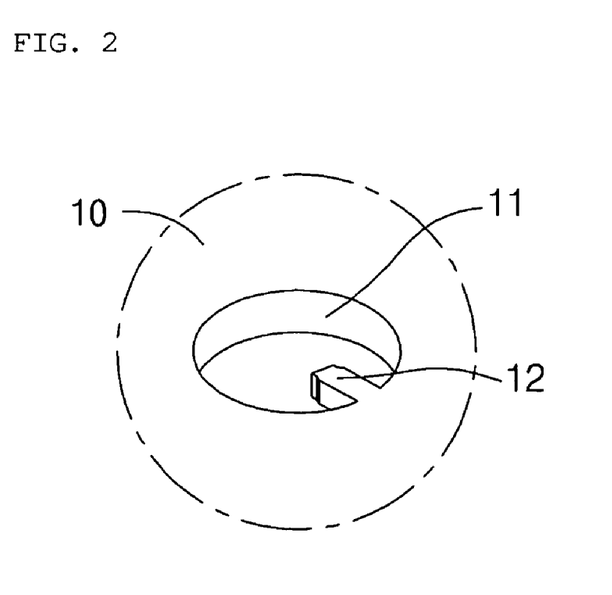
FIG. 2 is an enlarged view of a portion A showing main parts of the capacitor module of FIG. 1.

As shown in FIG. 1 and FIG. 2, the modularized capacitor device assembly is exposed to the outside only by a terminal 5 of a bus-bar 10 electrically connected with polar plates 1a and 1b of a capacitor device 1. The bus-bar terminal 5 becomes a polar element connected with a cable or another bus-bar (not shown).

The bus-bar 10 according to the conventional art includes oval or circular holes 11 having about a 10 mm diameter on the surface thereof. A lead frame 12 for soldering is formed on a circumference of the hole 11. The holes 11 are formed to correspond to the capacitor devices 1 one by one.

However, in the bus-bar 10 wherein the capacitor devices 1 and the holes 11 are provided corresponding to each other, during the soldering, it is hard for an iron tip to contact the polar plates 1a and 1b of the capacitor device 1 by interference with the hole 11 having such a small diameter. Or, heat of the lead frame 12 may be transmitted to a surface of the bus-bar 10. In this case, although solder is melted, the melted solder is not easily welded into the lead frame 12 and the polar plates 1a and 1b, thereby frequently causing poor bonding.

This is because a thick material is generally used for the bus-bar 10 so that the bus-bar 10 has an enough capacity for the current flowing in the capacitor device 1. Therefore, whereas it takes a long time to increase temperature of the lead frame 12, the solder having a low melting point is very rapidly melted. That is, the poor bonding is incurred due to the time-lag in melting between the different materials.

For this reason, the bus-bar 10 has been soldered and bonded by an operator's manual operation as described above. However, the holes 11 formed on the surface of the bus-bar 10 are too small to conveniently perform the soldering. In addition, the operator has to examine places of the poor bonding one by one, the poor bonding occurring between the capacitor device 1 and the bus-bar 10 due to the time-lag in melting between the different materials. Furthermore, a surface area of the bus-bar 10 increases according to increase of the number of capacitor devices 1, thereby increasing the whole weight of the capacitor module.

In the bus-bar 10 connected to the capacitor device 1 at a rear part of the outer case C, as a bent plate 10a being bent to be parallel with a lateral side of the capacitor device 1 is brought in contact with the outer case C of the capacitor device 1, the rear polar plate 1a and the front polar plate 1b may be applied with electricity, that is, a short circuit at two terminals 5 may frequently be caused by the outer case 1 of the capacitor device 1. To explain the reason of the short circuit more specifically, when spraying of metal is performed to form the polar plates 1a and 1b of the capacitor device 1, the outer case C is stained with part of the metal being sprayed. In addition, since the soldering is performed by the manual operation, the soldering position of the lead frame 12 of the bus-bar 10 soldered to the polar plates 1a and 1b becomes all different according to the operator. Accordingly, an interval between the outer case C of the capacitor device 1 and the bus-bar 10 is irregular.

Therefore, after the capacitor device 1 attached with the bus-bar 10 is housed in the outer case C and the epoxy is injected in between the bent plate 10a and an outer cover 1c, the injection is not smoothly performed, thereby generating a space. The bus-bar 10 and the outer cover 1c electrically contact each other in the space, thereby causing the short circuit.

SUMMARY OF THE INVENTION

Therefore, the present invention has been made in view of the above problems, and it is an object of the present invention to provide a bus-bar for assembling a capacitor device, capable of improving a soldering efficiency such that soldering of a bus-bar to polar plates of a plurality of capacitor devices can be rapidly and effectively performed, thereby improving the productivity, reducing an inferiority rate of the soldering operation, improving the soldering quality, and reducing the weight of the capacitor module.

In accordance with the present invention, the above and other objects can be accomplished by the provision of a bus-bar for assembling a capacitor device which is formed by winding a vapor-deposited metal film on one or both sides of a plastic film and equipped with polar plates, being made of Zn, a Zn alloy, or firstly of Zn and secondly of tin and formed on both sides of the wound part, the bus-bar forming anode and cathode plates by attaching each of the capacitor devices to a corresponding lead frame, comprising an opening part to partly expose the polar plates of two adjoining capacitor devices as overlapped with surfaces of the capacitor devices, and the lead frame formed on a circumference of the opening part, having a thickness decreasing toward an end thereof.

The lead frame of the bus-bar is formed thinner than the bus-bar or has a decreasing thickness toward an end thereof. On a surface of the bus-bar passed through an outer case of the capacitor device, a punching projection is provided to maintain a predetermined interval from an outer wall of the capacitor device.

According to the above, when the bus-bar is overlapped with an upper part of the polar plate, two adjoining polar plates can be exposed by one opening part. Therefore, the soldering operation can be performed without interference with the opening part. Since a surface area of the bus-bar is reduced by as much as an increased area of the opening part being cut out, the whole weight of the bus-bar can be reduced. Also, during the soldering, an undesirable loss of heat to a surface of the bus-bar can be restrained. As a result, while the soldering operation can be more rapidly achieved, the quality of soldered portions can be improved.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Hereinafter, an exemplary embodiment of the present invention will be described in detail with reference to the accompanying drawings.

Figure 3:
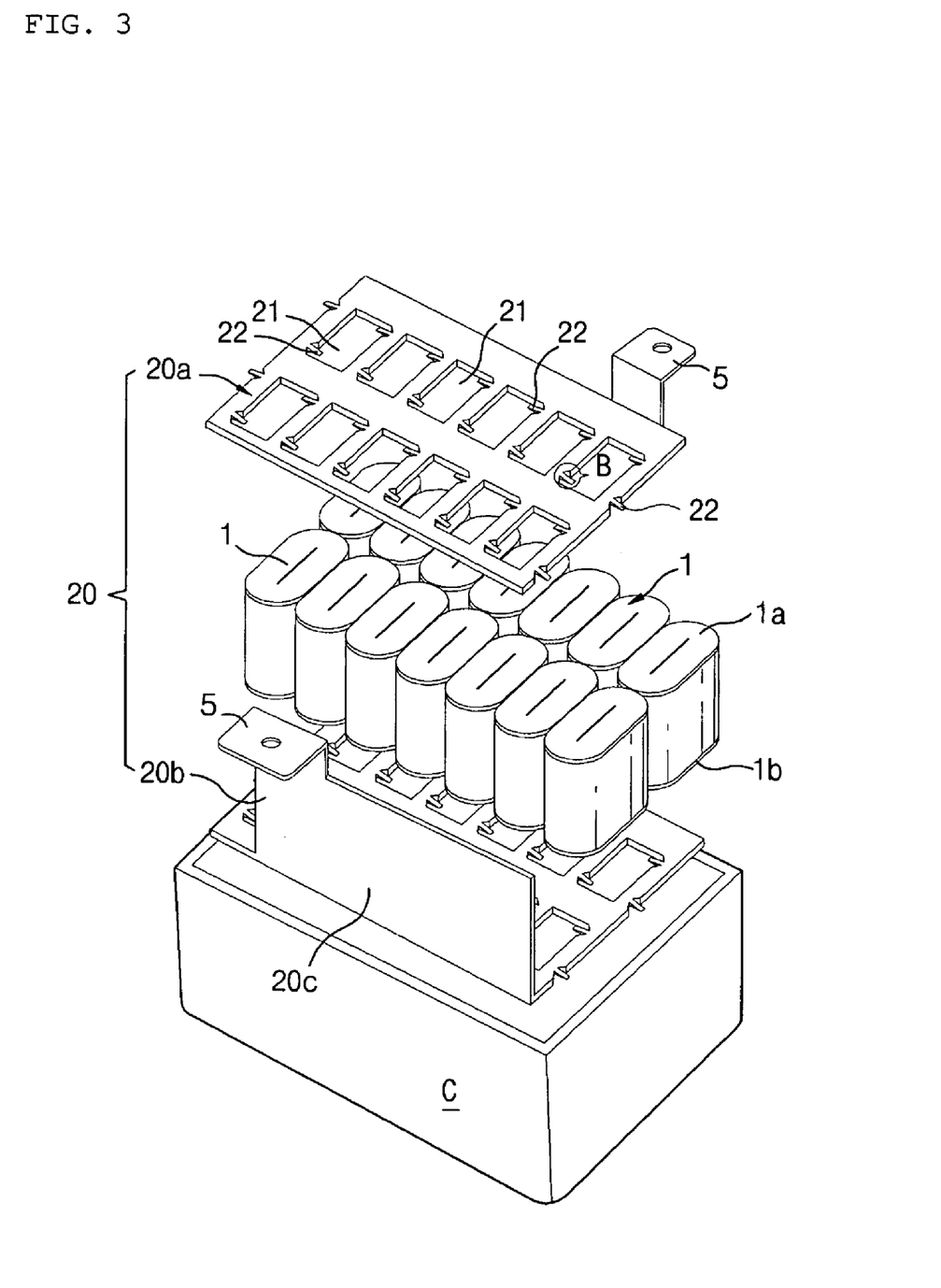
FIG. 3 is an exploded perspective view of a capacitor module adopting a bus-bar according to an embodiment of the present invention.
Figure 4:
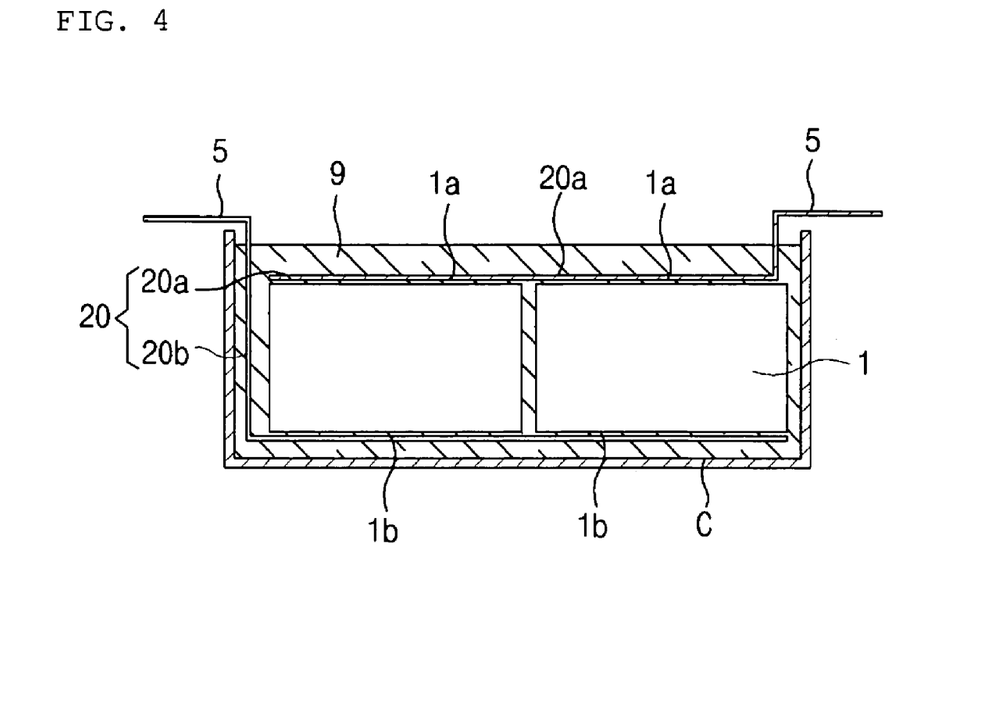
FIG. 4 is a sectional view showing a state where the capacitor device attached with the bus-bar is housed in an outer case.
Figure 5A:
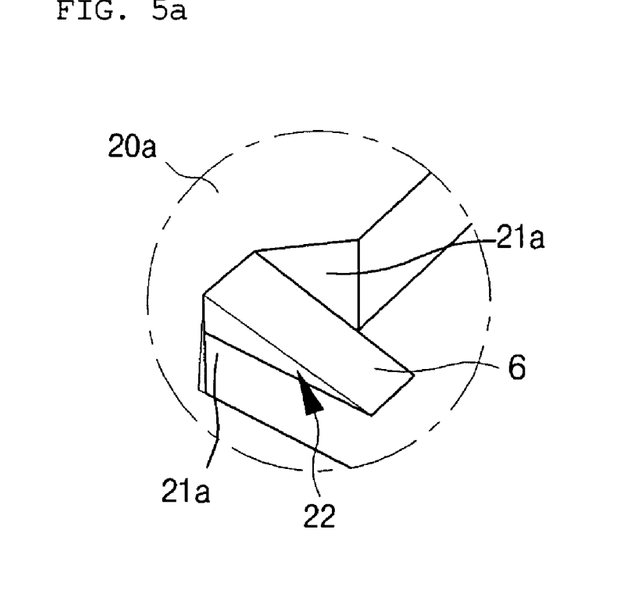
FIGS. 5A and 5B are enlarged perspective views of a portion B shown in FIG. 3 for showing a lead frame according to first and second embodiments of the present invention, respectively.
Figure 5B:
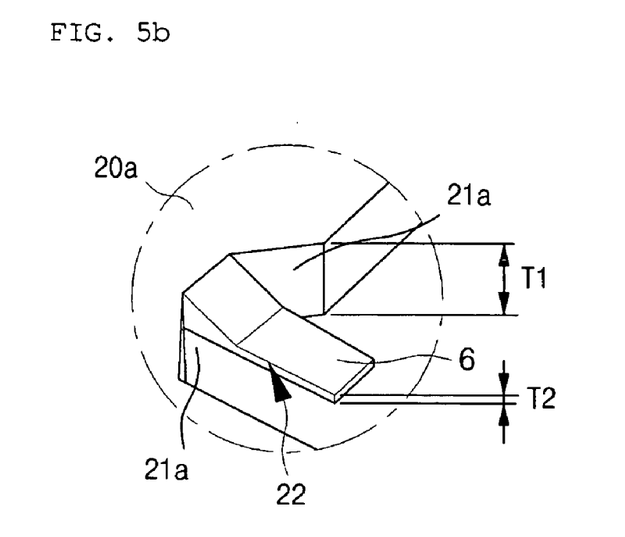
Figure 6A:
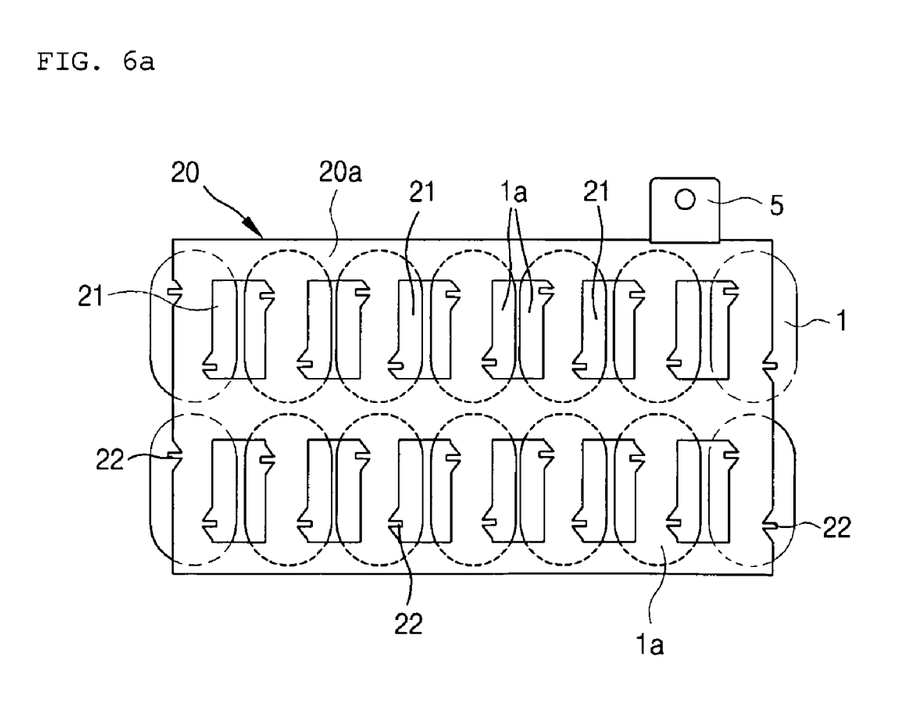
FIG. 6A is a plan view of the capacitor device attached with the bus-bar according to the embodiment of the present invention.
Figure 6B:
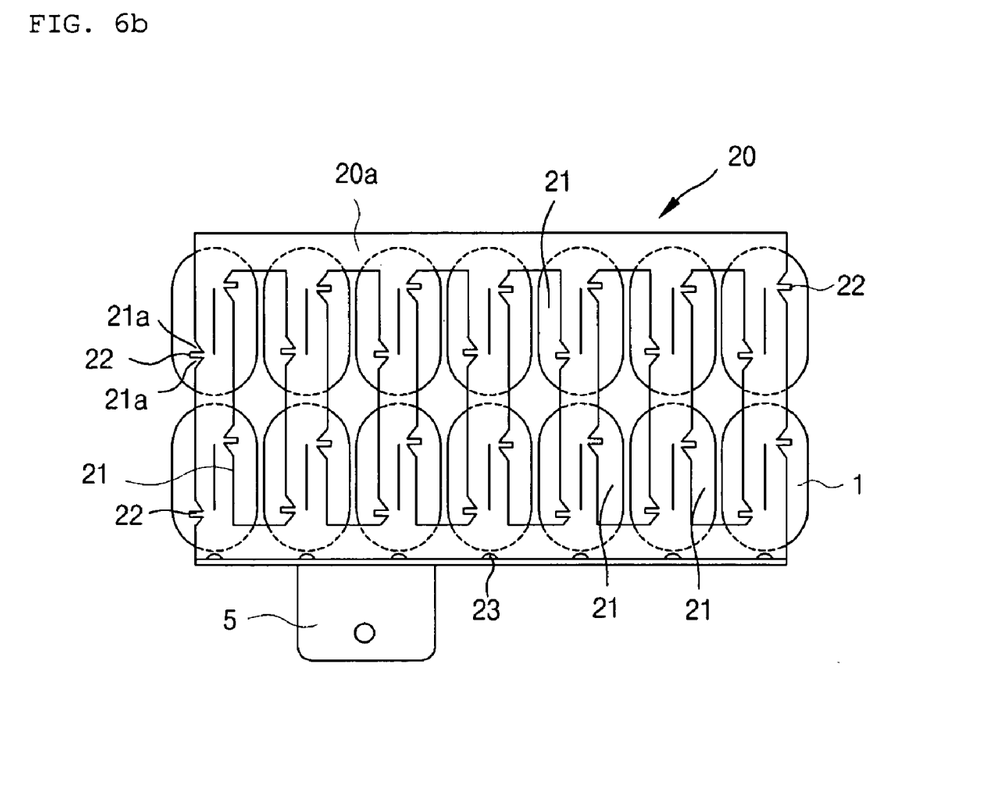
FIG. 6B is a plan view of the capacitor device attached with the bus-bar having a modified arrangement of opening parts, according to the embodiment of the present invention.

FIG. 3 is an exploded perspective view of a capacitor module adopting a bus-bar according to the embodiment of the present invention and FIG. 4 is a sectional view showing the capacitor device attached with the bus-bar being housed in an outer case. FIGS. 5A and 5B are enlarged perspective views of a portion B shown in FIG. 3 to show a lead frame according to first and second embodiments of the present invention, respectively. FIGS. 6A and 6B are plan views of the capacitor device attached with the bus-bars having different arrangements of opening parts, according to the embodiment of the present invention.

In a bus-bar 20 for assembling a capacitor device 1, opening parts 21 are cut at uniform intervals, more preferably, with respect to the middle of two adjoining capacitor devices 1 to expose polar plates 1a and 1b of the two adjoining capacitor devices 1.

The opening parts 21 are formed by cutting a surface of the bus-bar 20 so that the polar plates 1a of two adjoining capacitor devices 1 are exposed, in a case where the capacitor devices 1 are arranged by two rows and two lines, that is, two horizontal lines and two vertical lines as shown in FIG. 6A. The capacitor devices 1 may be in other arrangements comprising one or more rows and lines. FIG. 6B shows a modified structure of the opening parts, for a case where the capacitor devices 1 are arranged in at least two rows in a vertical direction. In this structure, the opening parts 21 formed on the surface of the bus-bar 20 may be configured to expose therethrough two polar plates 1a adjoining in the vertical direction.

A lead frame 22 is provided to each of the opening parts 21 to solder the bus-bar 20 to the respective adjoining polar plates 1a.

The lead frame 22 includes a partially-cut recess part 21a formed on a circumference of the opening part 21. The recess part 21a is provided to prevent solder melted during the soldering and cooled around the lead frame 22, from falling by an external shock. Also, the recess part 21a reinforces cohesion of the lead frame 22 which is thin.

The lead frame 22 is formed to be thinner than the bus-bar 20 by a pressing process. In addition, preferably, the lead frame 22 is disposed close to the polar plate 1a of the capacitor device 1 and has a contacting surface parallel with the polar plate 1a.

Because the lead frame 22 has a less thickness than the bus-bar 20, during the soldering, the time required for the lead frame 22 to reach a proper temperature can be reduced. Additionally, because the lead frame 22 is formed close to the polar plates 1a of the capacitor device 1 and parallel with the surface of the polar plate 1a, heat transmission to the polar plate 1a can be achieved through the lead frame 22. Furthermore, a cohesive force of the melted solder can be enhanced.

Referring to FIG. 5A, the lead frame 22 has a pointed tip to enhance the heat conduction speed. In FIG. 5B, the lead frame 22 is partly sloped to extend closer to the polar plate 1a, that is, protruded downward relative to a bottom of the bus-bar by 0.1 mm~0.5 mm. The bottom of the lead frame 22 is in parallel contact with the surface of the polar plate 1a. A reference numeral T1 in FIG. 5B refers to the thickness of the bus-bar, and T2 refers to the thickness of the lead frame 22, set to be smaller than T1. The lead frame 22 of this embodiment may have a 0.1 mm~5.0 mm thickness, a 0.5~20 mm length and a 0.5~20 mm width. As an exemplary embodiment, the bus bar 20 of a 1500 μF capacitor device is structured to have a 1.2 mm thickness while the lead frame 22 has a 5 mm length and a 0.5 mm thickness. Soldering is performed with the bus-bar 20 and a conventional bus-bar, comparatively. The result of soldering is shown in [Table 1] as follows:

TABLE 1

| Classification | Weight of bus-bar (g) | Number of inferior soldering of lead frame | Soldering time of lead frame (sec/point) |
| --- | --- | --- | --- |
| Bus-bar of the invention | 515 | 0/30 | 5 |
| Conventional bus-bar | 835 | 1/30 | 12 |

As can be understood from [Table 1], the weight of the bus-bar 20 is reduced by about 38.3% compared to the conventional bus-bar. There occurred no inferior soldering during soldering of the bus-bar 20. The soldering time is reduced by 7 seconds, thus improving the productivity by 2.4 times.

Figure 7A:
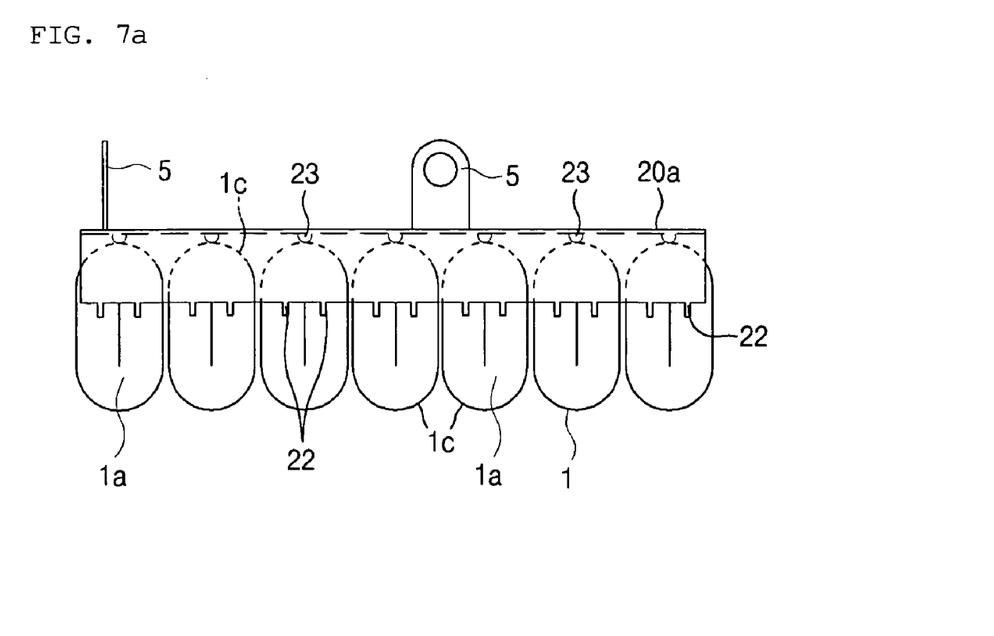
FIGS. 7A and 7B are side views showing the capacitor device in which a bus-bar is attached to a capacitor device, according to the embodiment of the present invention.
Figure 7B:
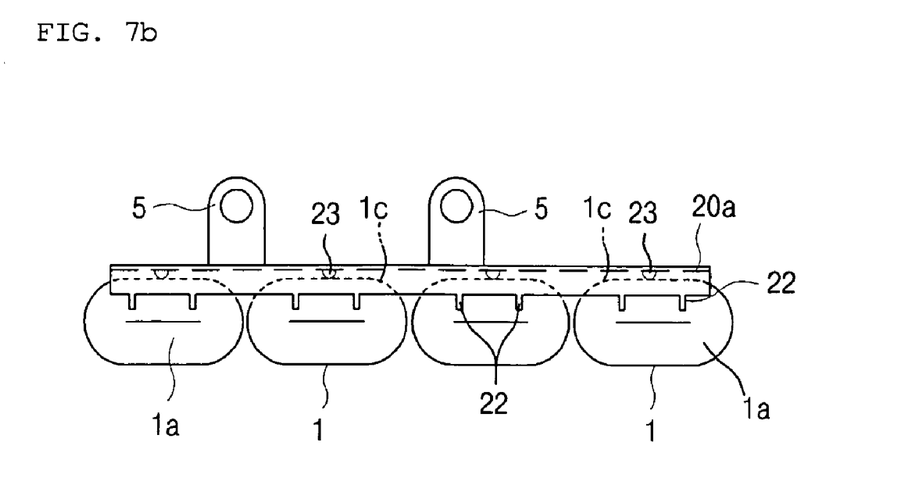
Figure 7C:
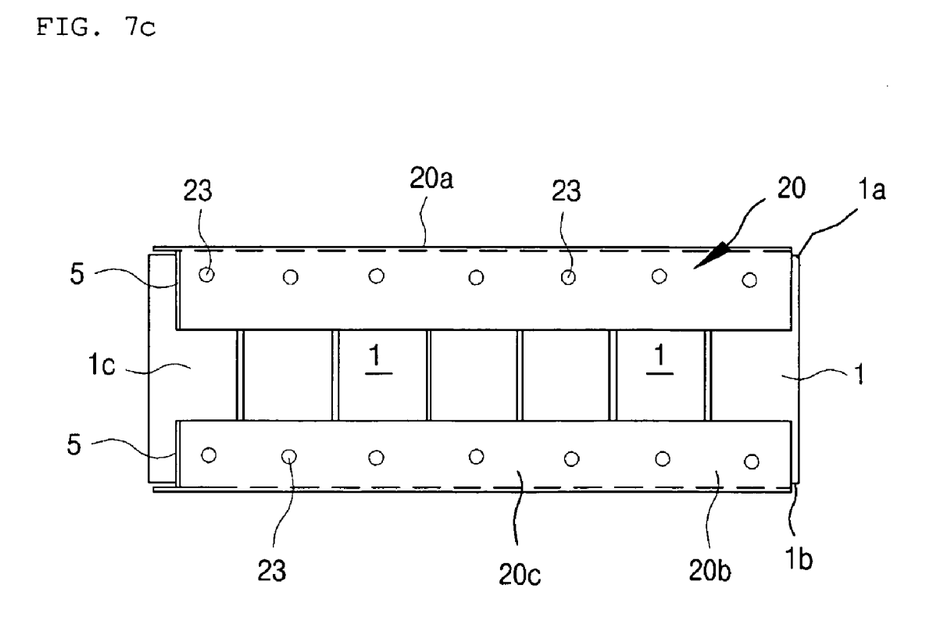
FIGS. 7C and 7D are plan views showing the capacitor device in which a bus-bar is attached to a capacitor device, according to the embodiment of the present invention.
Figure 7D:
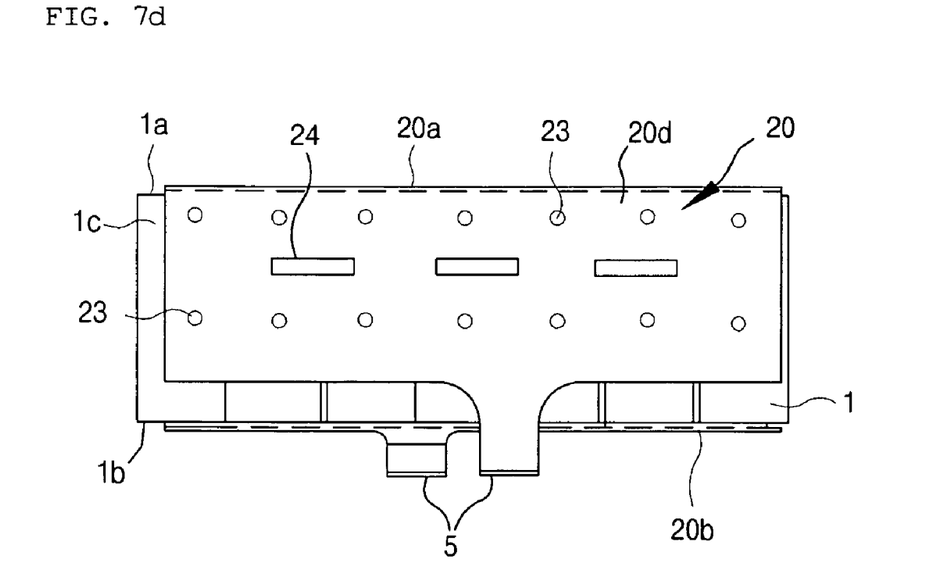

FIGS. 7A and 7B are plan views showing bus-bars soldered to the capacitor devices and FIGS. 7C and 7D are plan views showing bus-bars soldered to the capacitor devices.

Referring to FIG. 7A through FIG. 7D, the bus-bar 20 is soldered with the capacitor devices 1 laid on their sides. In addition, a punching projection 23 is formed on a surface of bent plates 20c and 20d of the bus-bar 20. By this, while the bus-bar 20 is being soldered to the front and the rear polar plates 1a and 1b, intervals between an outer cover 1c of the capacitor device 1 and the bent plates 20c and 20d can be maintained uniformly.

More specifically, during the soldering of the bus-bar 20, after the bus-bars 20a and 20b are spaced apart from the outer cover 1c of the capacitor device 1 and the capacitor device 1 is housed in the outer case C, epoxy is injected to fill a space of the outer case C. Here, the punching projection 23 helps smooth injection of the epoxy by generating a predetermined space. The epoxy filling the space between the bus-bar 20 and the capacitor device 1 functions as an insulator, thereby preventing a short circuit.

Figure 7E:
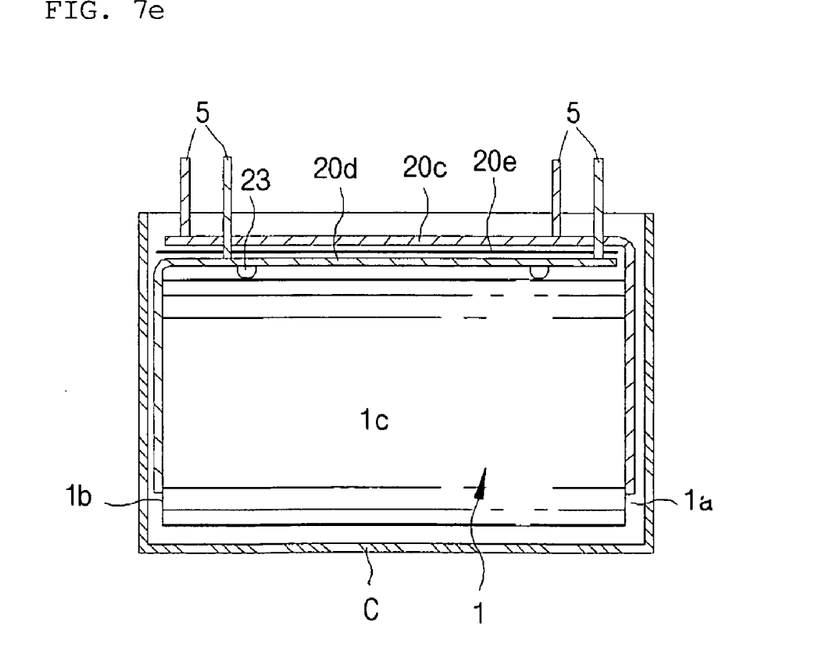
FIG. 7E is a sectional view showing main parts of a modified arrangement of two bus-bars having different polarities from each other.

Referring to FIG. 7E showing a modified arrangement of the bent plates 20c and 20d, when the bus-bar 20 is soldered to the front and the rear polar plates 1a and 1b of the capacitor device 1, the bent plates 20c and 20d are disposed to adjoin each other at the outer cover 1c of the capacitor device 1, near the opening part of the outer case C. In addition, the punching projection 23 is formed on the bent plate which is nearer to the outer cover 1c so that an interval between the outer cover 1c of the capacitor device 1 and either of the bent plates 20c and 20d. The two bent plates 20c and 20d are insulated from each other using an insulating member 20e.

Here, the terminal 5 may be arranged and directed variably according to the manufacturer's choice. A non-described reference numeral 20e refers to the insulating member filling a gap between the two bent plates 20c and 20d.

As can be appreciated from the above description, in accordance with the bus-bar 20 for the capacitor device 1 according to the present invention, the lead frame 22 soldered to the polar plates 1a and 1b are formed thinner than the other portions of the bus-bars 20a and 20b. The opening parts 21 are formed in a width direction or a longitudinal direction of the bus-bar 20 corresponding to the row and line arrangement of the capacitor devices 1. The above-structured opening parts 21 facilitates soldering of the lead frame 22. The punching projection 23 formed at the bent plates 20c and 20d of the bus-bar 20 helps reduce generation of an inferior capacitor module. Moreover, since the weight of the capacitor device can be reduced by as much as an increased area of the opening parts 21, quality of the capacitor device can be improved.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A bus-bar for assembling a capacitor device which is formed by winding a vapor-deposited metal film on one or both sides of a plastic film and equipped with polar plates, being made of Zn, a Zn alloy, or firstly of Zn and secondly of tin and formed on both sides of the wound part, the bus-bar forming anode and cathode plates by attaching each of the capacitor devices to a corresponding lead frame, comprising:

an opening part to partly expose the polar plates of two adjoining capacitor devices as overlapped with surfaces of the capacitor devices, and the lead frame formed on a circumference of the opening part, having a thickness decreasing toward an end thereof.

2. The bus-bar for assembling a capacitor device according to claim 1, wherein, when a plurality of capacitor devices are arranged in pluralities of horizontal and vertical lines, the opening part formed on a surface of the bus-bar is configured to expose two polar plates adjoining in a vertical direction.

3. The bus-bar for assembling a capacitor device according to claim 1, wherein the lead frame has a thickness of 0.1 mm~5.0 mm, a length of 0.5 mm~20 mm, and a width of 0.5 mm~20 mm.

4. The bus-bar for assembling a capacitor device according to claim 1, wherein the lead frame is bent toward the polar plates with respect to a surface of the bus-bar by 0.1 mm~5 mm, to be parallel with a surface of the polar plate.

5. The bus-bar for assembling a capacitor device according to claim 1, wherein the opening part includes a recess part formed at a circumference thereof.

6. The bus-bar for assembling a capacitor device according to claim 1, wherein a punching projection is formed at a bent plate of the bus-bar.

7. The bus-bar for assembling a capacitor device according to claim 1, wherein two bent plates are disposed around an outer cover of the capacitor device.

* * * * *